United States Patent
Honninger et al.

(10) Patent No.: US 11,955,766 B2
(45) Date of Patent: Apr. 9, 2024

(54) LASER SYSTEM AND METHOD FOR GENERATING LASER PULSES WITH VERY HIGH REPETITION RATE

(71) Applicant: AMPLITUDE SYSTEMES, Pessac (FR)

(72) Inventors: Clemens Honninger, Cestas (FR); Eric Audouard, Solignac-sous-Roche (FR)

(73) Assignee: AMPLITUDE, Pessac (FR)

(*) Notice: Subject to any disclaimer, the term of this patent is extended or adjusted under 35 U.S.C. 154(b) by 805 days.

(21) Appl. No.: 16/961,510

(22) PCT Filed: Jan. 10, 2019

(86) PCT No.: PCT/FR2019/050051
§ 371 (c)(1),
(2) Date: Jul. 10, 2020

(87) PCT Pub. No.: WO2019/138192
PCT Pub. Date: Jul. 18, 2019

(65) Prior Publication Data
US 2020/0343682 A1    Oct. 29, 2020

(30) Foreign Application Priority Data

Jan. 12, 2018  (FR) ........................ 1850249

(51) Int. Cl.
*H01S 3/00* (2006.01)
*H01S 3/08* (2023.01)
(Continued)

(52) U.S. Cl.
CPC .......... *H01S 3/1118* (2013.01); *H01S 3/0057* (2013.01); *H01S 3/0085* (2013.01);
(Continued)

(58) Field of Classification Search
None
See application file for complete search history.

(56) References Cited

U.S. PATENT DOCUMENTS 9,525,264 B2* 12/2016 Courjaud ................. H01S 3/11
2014/0050235 A1  2/2014 Clowes et al.

FOREIGN PATENT DOCUMENTS

WO  WO 2017222022 A1 * 12/2017 ............. H01S 3/067

OTHER PUBLICATIONS

Fochs et al, "Design and Preliminary Operation of a Gigahertz Repetition Rate Femtosecond Hybrid AlGaAs/Ti:Sapphire System for Advanced Photoinjectors", (1995), IEEE Lasers and Electro-Optics, pp. 212-213 (Year: 1995).*

(Continued)

*Primary Examiner* — Mark Hellner
(74) *Attorney, Agent, or Firm* — NIXON & VANDERHYE, PC

(57) ABSTRACT

Disclosed is a system and a method for generating high-power laser pulses with very high repetition rate. The laser system includes an oscillator capable of generating a source laser beam including a series of sources pulses with femtosecond or picosecond duration at a first repetition frequency no lower than 800 megahertz and an optical amplifier system suitable for receiving and amplifying the series of source pulses at a second repetition frequency that is equal to or a multiple of the first repetition frequency, the multiple being a non-negative integer greater than or equal to two, so as to generate a series of laser pulses with very high repetition frequency.

18 Claims, 3 Drawing Sheets

(51) Int. Cl.
    *H01S 3/081*     (2006.01)
    *H01S 3/0941*     (2006.01)
    *H01S 3/1118*     (2023.01)
    *H01S 3/23*     (2006.01)

(52) U.S. Cl.
    CPC ........ *H01S 3/08054* (2013.01); *H01S 3/0816* (2013.01); *H01S 3/09415* (2013.01); *H01S 3/2316* (2013.01)

(56) References Cited

OTHER PUBLICATIONS

International Search Report, dated Jan. 10, 2019, from corresponding PCT application No. PCT/FR2019/050051.
Magné et al.; Generation of a 4 × 100 GHz Pulse-Train From a Single-Wavelength 10-GHz Mode-Locked Laser Using Superimposed Fiber Bragg Gratings and Nonlinear Conversion; Journal of Lightwave Technology; May 1, 2006; pp. 2091-2099; vol. 24, No. 5.
Elsmere et al.; High-Repetition-Rate Subpicosecond Source of Fiber-Amplified Vertical-External-Cavity Surface-Emitting Semiconductor Laser Pulses; IEEE Photonics Technology Letters; Apr. 15, 2008; pp. 623-625; vol. 20, No. 8.
Sander et al.; 10GHz Waveguide Interleaved Femtosecond Pulse Train; Lasers and Electro-Optics (CLEO), Laser Science to Photonic Applications; May 1, 2011; pp. 1-2.
Akçaalan et al.; Compact 1.5-GHz intra-burst repetition rate Yb-doped all-PM-fiber laser system for ablation-cooled material removal; 2017 Conference on Lasers and Electro-Optics Europe & European Quantum Electronic Conference (CLEO/Europe-EQEC); IEEE; Jun. 25, 2017; pp. 1.
Kerse et al.; 3.5-GHz intra-burst repetition rate ultrafast Yb-doped fiber laser; Optics Communications; May 1, 2016; pp. 404-409; vol. 366.

* cited by examiner

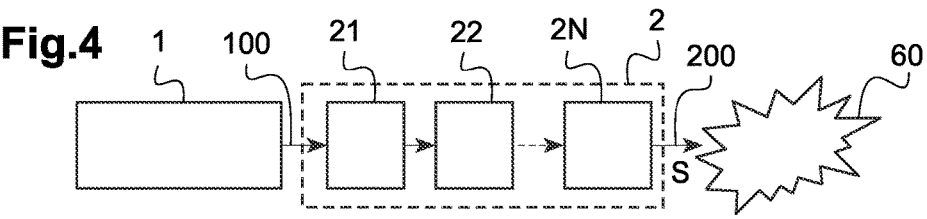
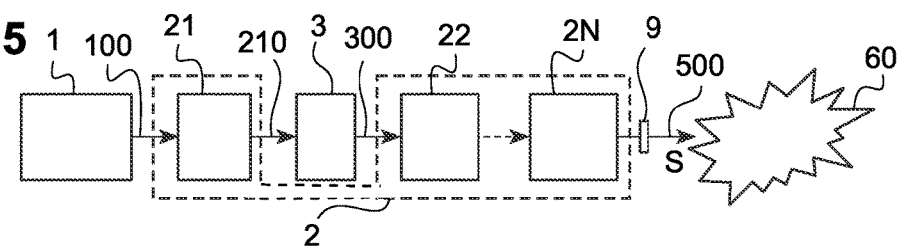
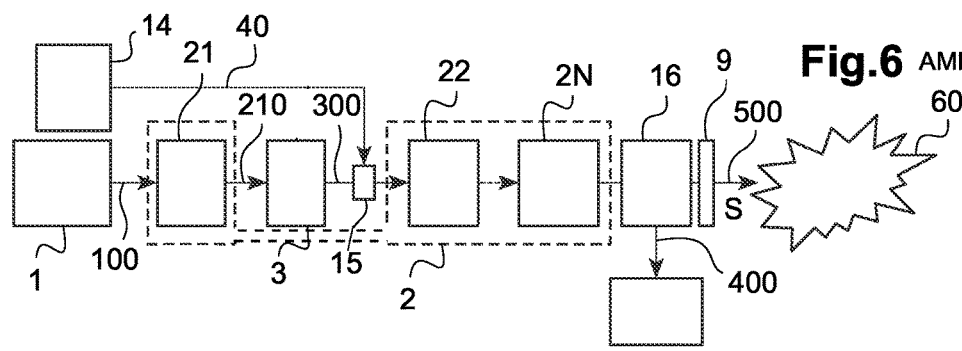
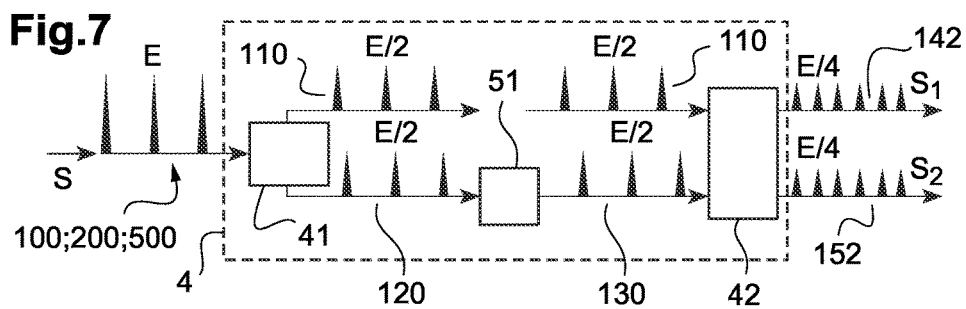
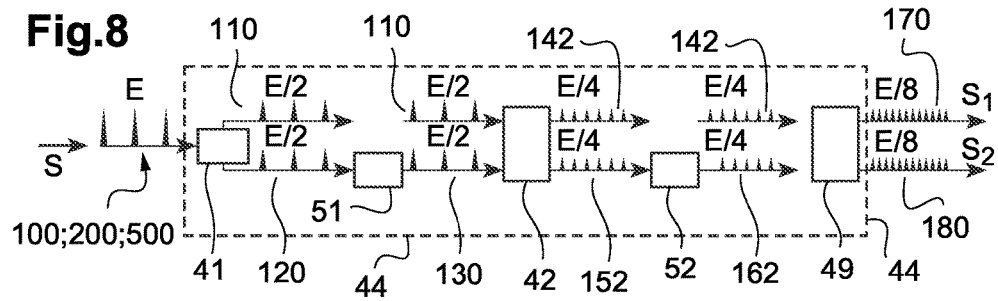

Fig.9
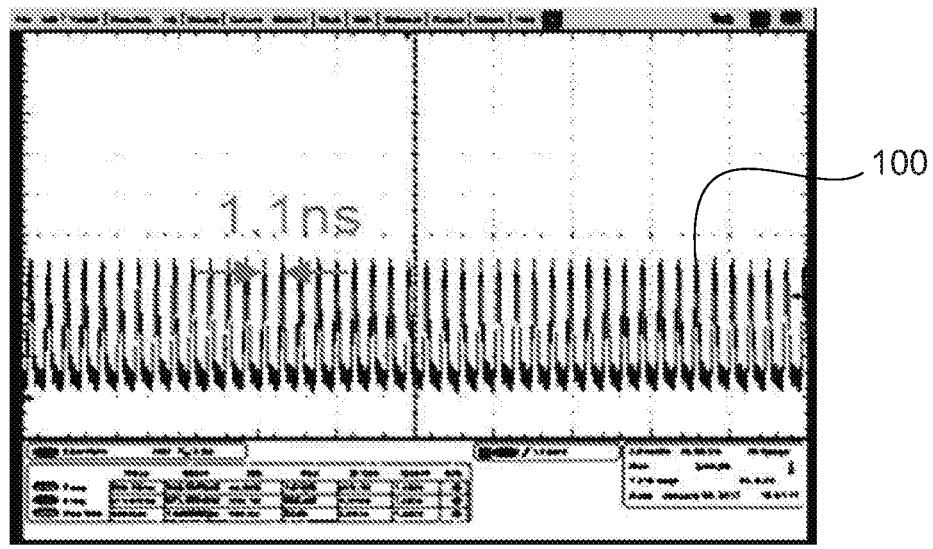
Fig.10
Fig.11
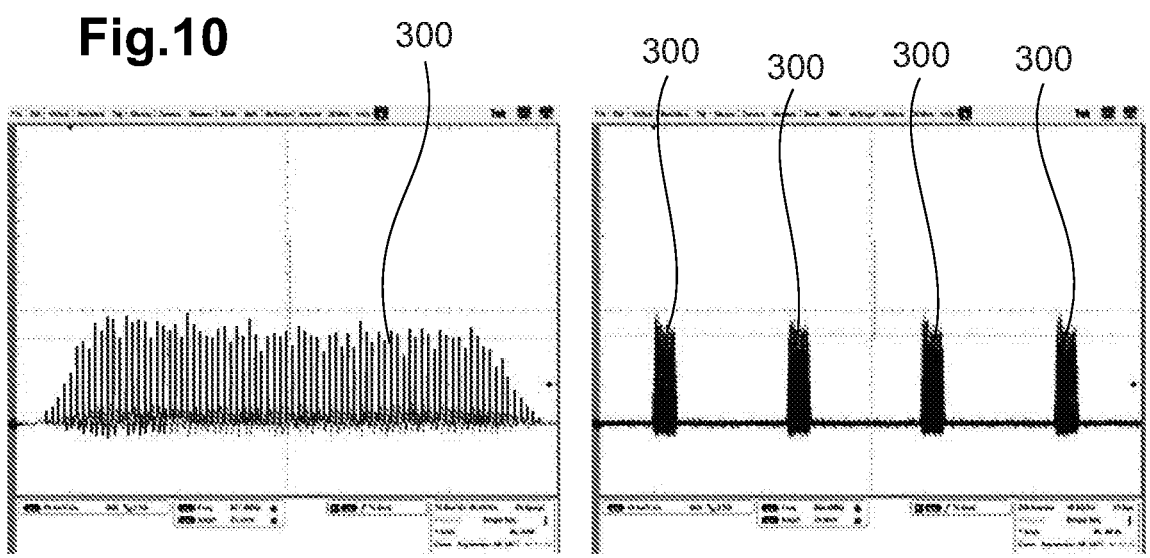

LASER SYSTEM AND METHOD FOR GENERATING LASER PULSES WITH VERY HIGH REPETITION RATE

TECHNICAL FIELD TO WHICH THE INVENTION RELATES

The present invention generally relates to the field of pulse lasers.

It more particularly relates to an ultra-short and high-power pulse laser system.

It relates in particular to a system and a method for generating ultra-short, high-power laser pulses, having a modulable repetition frequency.

TECHNOLOGICAL BACK-GROUND

The repetition rate or frequency of the pulses emitted by a pulse laser is often determined as a function of the architecture used and of the desired specifications for the laser beam.

An architecture of the master oscillator-power amplifier (MOPA) type is commonly used to make high-power laser sources. In this case, a source called master oscillator generates a source signal consisted of source pulses. This source signal is amplified in an optical amplifier system including one or several amplification stages in series. Different types of sources exist. The source can be pulsed, in particular a source based on a mode-locking laser, whose oscillator cavity length defines a repetition frequency. A pulse source can also be based on a switched oscillator (Q-switched).

In certain applications, the user may need to increase the power of the incident laser beam while maintaining the ultra-short duration and the energy of the laser pulses.

An increase of the pulse repetition frequency can allow increasing the power of the laser beam but to the detriment of the energy per pulse (see the publication Can Kerse et al., "3.5 GHz intra-burst repetition rate ultrafast Yb-doped fiber laser", Optics Communication 366, 2016, 404-409).

The publication J. Magne et al., "Generation of a 4×100 GHz pulse-train from a single-wavelength 10-GHz mode-locked laser using superimposed fiber Bragg gratings and nonlinear conversion", Journal of Lightwave Technology, vol. 24, no. 5, 2006, describes a repetition frequency multiplier based on superimposed fibre Bragg gratings (FBGs).

The publication Elsmere S. P. et al. "High-repetition-rate subpicosecond source of fiber-amplified Vertical-External-Cavity Surface-Emitting Semiconductor Laser pulses", IEEE Photonics Technology Letters, vol. 20, no. 8, 2008, describes a semiconductor laser, of the VECSEL type, combined to a mode-locking saturable absorber (SESAM) cavity, which emits directly pulses at a repetition frequency of several gigahertz.

The publication Michelle Y Sander et al. "10 GHz waveguide interleaved femtosecond pulse train", 2011, Conference on Lasers and Electro-Optics (CLEO) 2011, describes a laser source comprising a femtosecond (fs) oscillator coupled to a waveguide device integrated to a planar circuit comprising Mach-Zehnder interferometers thermally adjustable to generate a train of fs pulses at two or four times the oscillator frequency.

It is desirable to develop a laser system adapted to generate high-power laser pulses at very high energy and/or very high rate for industrial applications.

Generally, it is desirable to increase the peak power available in a pulse laser source while limiting the number of optical amplifiers.

In particular, it is desirable to develop a laser system generating laser pulses of high power and high energy, from one hundred of nJ to a few tenth of µJ, at a modulable repetition frequency, which can go from a pulse on demand to a very high-rate pulse train, or also one or several bursts of pulses with a modulable duration for each burst and/or between successive bursts.

OBJECT OF THE INVENTION

In order to remedy the above-mentioned drawbacks of the state of the art, the present invention proposes a very high-rate laser system.

More particularly, it is proposed according to the invention a very high-rate laser system including a mode-locking oscillator adapted to generate a source laser beam comprising a series of source pulses of femtosecond or picosecond duration, at a first repetition frequency F1 higher than or equal to 800 megahertz, and an optical amplifier system adapted to receive and amplify the series of source pulses to a second repetition frequency equal to or multiple of the first repetition frequency F1, the multiple being a natural integer number higher than or equal to two, so as to generate a series of laser pulses of very high repetition frequency.

According to a particular and advantageous embodiment, the laser system further includes a repetition frequency multiplier device placed between the oscillator and the optical amplifier system, the repetition frequency multiplier device comprising a first optical coupler-splitter, a first optical delay line and a second optical coupler-splitter having a first output, the first optical coupler-splitter being adapted to spatially split the source laser beam into a first pulse beam at the first repetition frequency and a second pulse beam at the first repetition frequency, the first optical delay line being arranged between the first optical coupler-splitter and the second optical coupler-splitter on a trajectory of the second pulse beam at the first repetition frequency, the first optical delay line being adapted to induce an optical delay equal to a half-period of the first repetition frequency on the second pulse beam and to generate a second pulse beam delayed by a half-period, and the second optical coupler-splitter being adapted to recombine the first beam and the second beam delayed by a half-period and to form on the first output a first recombined beam in which the pulses are rated at the second repetition frequency equal to twice the first repetition frequency.

Advantageously, the second optical coupler-splitter has a second output, the second optical coupler-splitter being adapted to form on the second output a second recombined beam comprising pulses at the second repetition frequency equal to twice the first repetition frequency, the first recombined beam and the second recombined beam being synchronized between each other at the output of the second optical coupler-splitter.

According to a variant of this embodiment, the repetition frequency multiplier device comprises a second optical delay line and an optical combiner having a first output, the second optical delay line being arranged between the second optical coupler-splitter and the optical combiner on a trajectory of the second recombined beam, the second optical delay line being adapted to induce an optical delay equal to a quarter of period of the first repetition frequency on the second recombined beam and to generate a second pulse beam delayed by a quarter of period, and the optical combiner being adapted to recombine the first recombined beam and the second pulse beam delayed by a quarter of period and to form on its first output a first quadruple-repetition frequency beam, comprising pulses at a third repetition frequency equal to the quadruple of the first repetition frequency.

Advantageously, the optical combiner has a second output, the optical combiner being adapted to form on its second output a second quadruple repetition frequency beam, comprising pulses at the third repetition frequency equal to the quadruple of the first repetition frequency, the first quadruple-repetition frequency beam and the second quadruple repetition frequency beam being synchronized between each other at the output of the optical combiner.

According to a particular and advantageous aspect, the first optical coupler-splitter, the second optical coupler-splitter and, respectively, the optical combiner are polarizing or polarization-maintaining couplers, further including a polarizer device adapted to combine the first recombined beam and the second recombined beam or, respectively, the first quadruple-repetition frequency beam and the second quadruple repetition frequency beam.

According to another particular and advantageous aspect, the laser system further includes a pulse compressor placed on the first output of the second optical coupler-splitter and/or another pulse compressor placed on the second output of the second optical coupler-splitter.

According to still another particular and advantageous aspect, the laser system further comprises a pulse compressor placed on the first output of the optical combiner and/or another pulse compressor placed on the second output of the optical combiner.

Other non-limitative and advantageous features of the laser system according to the invention, taken individually or according to all the technically possible combinations, are the following:
- the mode-locking oscillator is chosen among: a semiconductor oscillator or a solid-state oscillator, operating for example in soliton regime, an oscillator with a highly-doped fibre of length comprised between 7 cm and 10 cm, or a hybrid fibre/solid state oscillator, with a very short highly-doped fibre, of length lower than or equal to about 15 cm, comprised for example between 7 cm and 10 cm, as a fibre active medium;
- the optical amplifier system includes an optical amplifier or a plurality of optical amplifiers chosen among the following types of optical amplifiers: active fibre-optic amplifier and/or crystal amplifier;
- the crystal amplifier is of the rod, slab or thin disk type;
- the optical amplifier system includes a plurality of optical amplifiers arranged in cascade, the plurality of optical amplifiers including an optical power amplifier;
- the laser system further includes a non-linear, optical frequency doubler or optical frequency tripler optical system;
- the laser system further includes a pulse picker placed downstream from the oscillator and upstream from the optical amplifier system or, respectively, from the optical power amplifier, the pulse picker being adapted to select and/or modulate in amplitude a burst of pulses and to inject the burst of pulses into the optical amplifier system or, respectively, into the optical power amplifier;
- the laser system further optionally includes another source adapted to generate a pulse beam complementary of the burst of pulses and another coupler arranged so as to receive the secondary beam and the source burst of pulses and combine them into a composite pulse beam having a repetition frequency equal to the intra-burst repetition frequency of the burst of pulses, the other coupler being adapted to inject the composite pulse beam into the optical amplifier system or into the optical power amplifier.
- the laser system further includes an optical modulator placed downstream from the optical amplifier system, the optical modulator being adapted to select a burst or a plurality of bursts of amplified pulses and/or to modulate in amplitude the burst or the plurality of bursts of amplified pulses.

The invention also proposes a method for generating very high-rate laser pulses comprising the following steps:
- generating a series of source pulses of femtosecond or picosecond duration by an oscillator having a first repetition frequency higher than or equal to 800 megahertz, and
- optically amplifying the series of source pulses to a second repetition frequency equal to or multiple of the first repetition frequency (F1), the multiple being a natural integer number higher than or equal to two, so as to generate a series of very high-rate laser pluses.

DETAILED DESCRIPTION OF AN EXEMPLARY EMBODIMENT

The following description in relation with the appended drawings, given by way of non-limitative example, will allow a good understanding of what the invention consists of and of how it can be implemented.

In the appended drawings:

FIG. 1 schematically shows a laser system according to the invention based on a very high-rate oscillator;

FIG. 2 schematically illustrates an exemplary embodiment of a femtosecond laser oscillator operating at a very high rate;

FIG. 3 schematically illustrates another exemplary embodiment of a femtosecond laser oscillator operating at a very high rate;

FIG. 4 schematically shows a laser system according to a first embodiment of the invention, based on a very high-rate oscillator;

FIG. 5 schematically shows a laser system according to a second embodiment of the invention, further comprising a pulse picker;

FIG. 6 schematically shows a laser system according to a third embodiment of the invention, comprising an inversion stabilization device for the optical power amplifier system;

FIG. 7 schematically shows the structure of a repetition frequency doubler intended to be used in combination with one of the embodiments;

FIG. 8 schematically shows the structure of a factor-4 repetition frequency multiplier intended to be used in combination with one of the embodiments of the invention;

FIG. 9 illustrates an example of source pulses coming from a very high-rate oscillator;

FIGS. 10-11 illustrate an example of generation of bursts of high-energy laser pulses at a very high rate.

DEVICE AND METHOD

Figure 1:
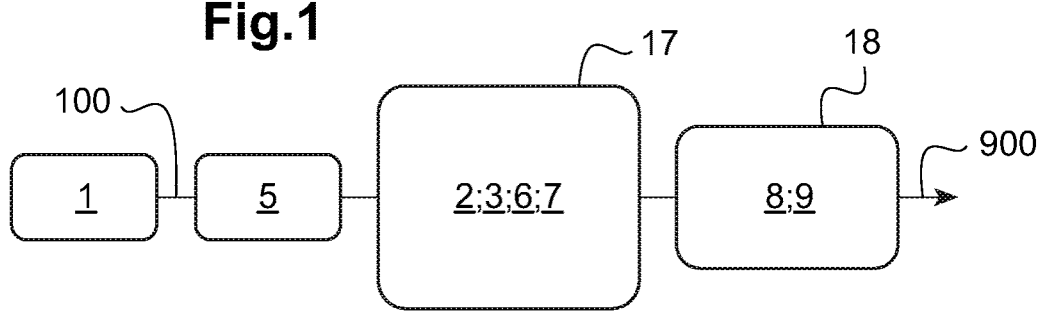

FIG. 1 shows, as a block-diagram, the main components of a laser system based on a mode-locked oscillator 1 operating at a high rate close to one GHz, a passive optical fibre 5, a first active optical fibre monolithic sub-system 17 and another optical sub-system 18 operating in free space.

In the present document, it is meant by active optical fibre a doped optical fibre used as an optical amplifier medium, for example a rare-earth doped optical fibre. It is meant by passive optical fibre a generally non-doped optical fibre that is not used as an optical amplifier medium and having mainly a transmission function.

In a conventional pulse laser system, an active optical fibre oscillator is generally used, which operates at a repetition frequency of the order of 100 MHz and, in any case, lower than 500 MHz. A fibre oscillator in this frequency range corresponds to a cavity having a length of at least 20 cm to integrate all the functions necessary to the oscillator operation.

The oscillator 1 is here a femtosecond (or picosecond) oscillator that generates ultrashort source pulses 100 at a first repetition frequency, denoted F1. An oscillator is chosen, which operates at a first repetition frequency, F1, that is higher than or equal to 500 MHz and, preferably, higher than or equal to 800 MHz or even higher than or equal to 1 GHz.

The oscillator 1 is preferably a mode-locking oscillator. In an example, the oscillator 1 is a semiconductor oscillator (of the VCSEL type) or also a solid-state oscillator operating in soliton regime. In another variant, the oscillator 1 is a hybrid oscillator comprising elements in free space and a highly doped optical fibre of a few cm long.

The oscillator 1 generates ultra-short source pulses 100 that are of low energy, of the order of 1 to 100 pJ per pulse. This level of energy per pulse is much lower than the energies required to reach the ablation threshold for solid materials such as glass, semiconductor or metal, which is beyond one hundred of $mJ/cm^2$.

An oscillator based on binary or ternary semiconductor compounds, for example InGaAs, InP or InGaP, of the VCSEL type, makes it possible to easily tune the wavelength of the source pulses to a wide spectral band compatible with an ytterbium-doped active optical fibre amplifier operating at a wavelength of ~1030 nm and/or with an erbium-doped active optical fibre amplifier operating at a wavelength of ~1500 nm, or also a thulium or holmium-doped active optical fibre amplifier operating at a wavelength of ~2000 nm. Moreover, an oscillator of the VCSEL type is adapted to operate in a repetition frequency range going up to 10 GHz or 20 GHz.

The first active optic fibre monolithic sub-system 17 includes, for example, an active optical fibre amplifier system 2, comprising for example an active optical fibre pre-amplifier and, potentially, one or several active optical fibre power amplifiers. Advantageously, the first sub-system 17 further includes a pulse picker 3 and/or a pulse stretcher 6 and/or an optical isolator 7, arranged between the active optical fibre pre-amplifier and the active optical fibre power amplifier(s). The pulse stretcher 6 is preferably consisted of a passive optical fibre of suitable length or of chirped Bragg gratings or also of a specific dispersion optical fibre (band-gap fibre).

The other optical sub-system 18 includes for example an optical isolator, potentially an optical power amplifier, a pulse compressor 8 and/or an optical modulator 9. In a known manner, the pulse compressor 8 operates to recompress the stretched pulses in the stretcher 6 of the first sub-system 17 upstream from the optical power amplification. The optical modulator 9 has a function of optical gate, it operates to select one or several pulse trains at the output.

The laser system of FIG. 1 makes it possible to generate a femtosecond laser pulse train 900 at a repetition frequency higher than or equal to one gigahertz (GHz) or a femtosecond laser pulse burst train at an intra-burst repetition frequency higher than or equal to one gigahertz (GHz) and an inter-burst repetition frequency of for example 100 Hz, or 100 kHz, or also of the order of one MHz or more.

Figure 2:
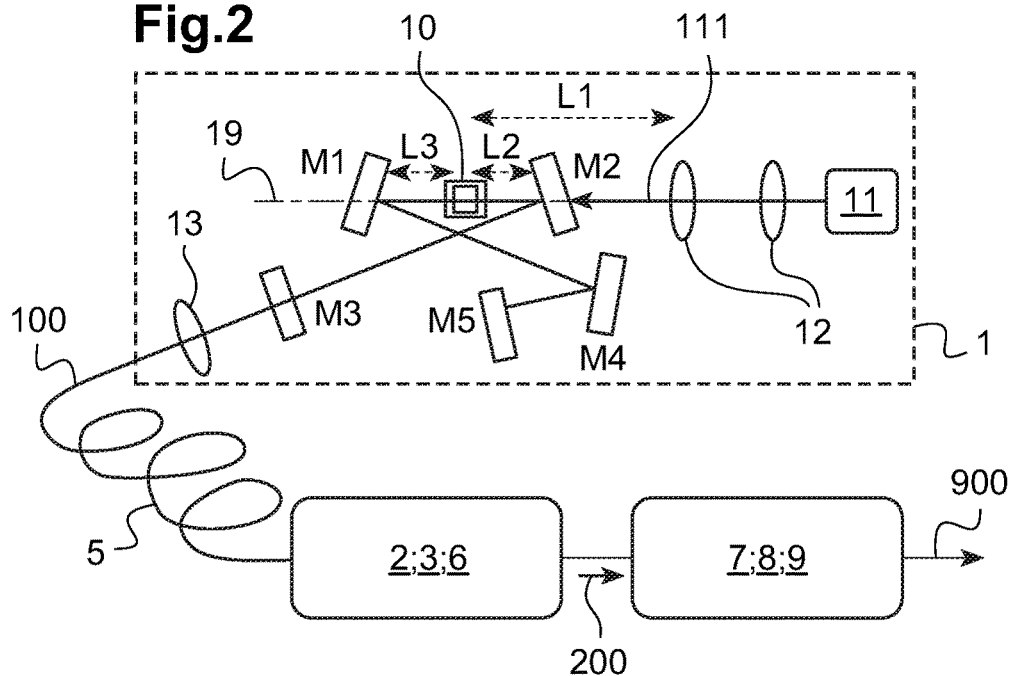

FIG. 2 shows a detailed example of configuration of a mode-locked and high repetition-frequency oscillator. The mode-locked oscillator 1 includes a pump 11, an input optical system 12, a resonant optical cavity comprising mirrors M1, M2, M3, M4 and M5, a laser active medium 10 arranged in the resonant optical cavity and an output optical system 13. Preferably, the laser active medium 10 is consisted of a laser crystal having a thickness equal, for example, to 10 mm. The laser active medium 10 is for example consisted of a passive solid matrix (glass, YAG, KGW, fibre . . . ) and a rare earth ion-based active dopant, most often ytterbium or erbium, thulium or holmium. The optical length of a round trip in the resonant cavity is of the order of 15 cm. A crystal or a very highly doped and very short active fibre of about 7 cm to 10 cm of maximum length makes it possible to significantly reduce the optical length of the resonant cavity defined by the real length divided by the optical index of the crystal or, respectively, of the active fibre, by comparison with an active medium based on a relatively less doped active optical fibre, and hence to make a laser oscillator having, by construction, a very high first repetition frequency F1. Here, it is meant by crystal or very highly doped optical fibre, a crystal or an optical fibre doped with active ions in such a manner that the absorption length at the pump wavelength is far lower than the crystal or optical fibre length (by a factor 1 or 2). In practice, in this case, the length of absorption is lower than a few cm.

In an exemplary embodiment, the laser active medium 10 is placed in the air. According to a variant, the laser active medium 10 is a crystal that is fastened by two non-doped glass or crystal blocks to the two end mirrors of the resonant cavity to form an airless monolithic structure.

The pump diode 11 generates a continuous or almost-continuous pump radiation 111. The input optical system 12 injects the pump radiation 111 into the resonant optical cavity along the longitudinal optical axis 19 of the cavity through the mirror M2. The mirror M2 is transparent to the pump radiation 111. The input optical system 12 is for example a lens optical system. The input optical system 12 focuses the pump radiation 111 to an active laser medium 10. The active laser medium 10 emits a source laser beam. The mirrors M1, M2, M4 and M5 are reflective for the source laser beam. The mirror M5 includes a semiconductor saturable absorber making it possible to initiate and maintain the mode-locking effect. The mirror M3 is partially reflective and partially transparent for the source laser beam.

In an exemplary embodiment, the distance L1 between the input optical system 12 and the active laser medium 10 is of about 60 mm, the distance L2 between the centre of the concave mirror M2 and a face of the crystal forming the active laser medium 10 is of about 15 mm, the distance L3 between the centre of the concave mirror M1 and the other face of the active laser crystal 10 is of about 15 mm, the distance between the concave mirror M1 and the mirror M4 is of about 66 mm, the distance between the mirror M4 and the mirror M5 is of about 15 mm and the distance between the concave mirror M2 and the mirror M3 is of about 60 mm. The physical length of the cavity is of about 170 mm. The repetition frequency F1 is then of 880 MHz, the repetition period is of about 1.1 ns.

As known, the resonant optical cavity is configured to operate in locked mode so as to generate at the output of the resonant optical cavity a source laser beam comprising a source pulse train 100 of femtosecond duration at a first repetition frequency (F1) higher than or equal to 800 megahertz (MHZ). The output optical system 13 injects the pulsed source laser beam into the passive optical fibre 5.

The passive optical fibre 5 injects the pulsed source laser beam into the first monolithic sub-system 17. The optical amplifier system 2 amplifies the source pulses 100 and forms laser pulses at the first repetition frequency (F1). Advantageously, the pulse picker 3 selects several pulses forming a burst of pulses having an intra-burst repetition frequency equal to the first repetition frequency (F1). As an alternative, the pulse picker 3 selects several bursts of pulses. In a particular embodiment, the pulse picker 3 selects a determined number of pulses to create one or several bursts of pulses.

Figure 3:
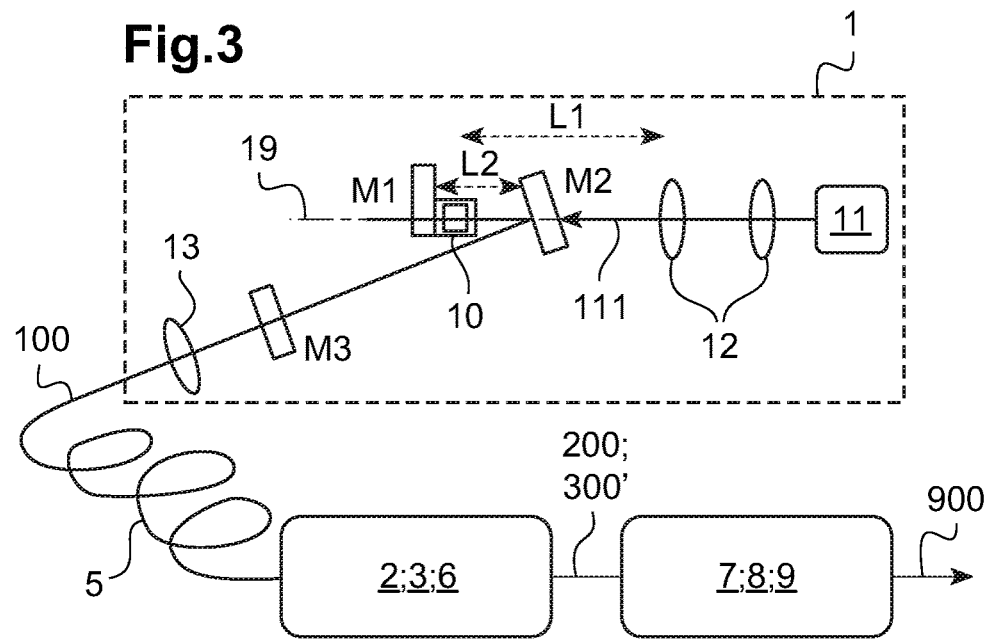

FIG. 3 shows another detailed example of configuration of a mode-locked and high-repetition frequency oscillator. The same reference signs denote the same elements as in FIGS. 1-2. In the configuration of FIG. 3, the resonant optical cavity includes only the laser active medium 10, a mirror M1, a mirror M2 and a mirror M3. The length of the cavity illustrated in FIG. 3 is smaller than that illustrated in FIG. 2. The configuration of FIG. 3 hence makes it possible to obtain a higher first repetition frequency F1, for example higher than 1 GHz.

FIG. 4 shows a laser system including an oscillator 1 and an optical amplifier system 2.

The optical amplifier system 2 comprises an optical amplifier or several optical amplifiers arranged in cascade. The optical amplifier system 2 is consisted of one or several active optical fibre amplifier(s) and/or crystal amplifier(s) and/or a hybrid amplifier system. In the present document, it is meant by hybrid amplifier system a system comprising a combination of at least one fibre amplifier and at least one crystal amplifier. For example, the optical amplifier system 2 includes a first optical amplifier 21 or pre-amplifier, a second optical amplifier 22 and an N-th optical amplifier 2N. The optical amplifiers 22, . . . , 2N are for example optical power amplifiers.

In the first embodiment illustrated in FIG. 4, the oscillator 1 generates a source laser beam comprising a series of source pulses 100 at the first repetition frequency F1. The optical amplifier system 2 receives the series of source pulses 100 and amplifies them to form a series of laser pulses 200 at the first repetition frequency F1. This first embodiment makes it possible to generate laser pulses 200 at a very high first repetition frequency F1. However, the mean power being limited by the optical amplifier system 2, the energy of each laser pulse 200 is then limited by the very high repetition frequency F1. In an exemplary embodiment, an oscillator 1 is considered, which generates source pulses of duration ~250 fs at a first repetition frequency F1 of 880 MHz combined with an optical amplifier system 2 comprising a passive fibre stretcher, a single-mode fibre pre-amplifier and a wide-core single-mode fibre amplifier. The mean power at the output of the optical amplifier system 2 is of the order of 20 W. In this case, the laser pulses 200 are temporally separated by 1.1 ns and the energy E is limited to about a few tenths of nanojoules per laser pulse 200 on the output S, liable to reach the microjoule for mean powers of the order of the kW. This level of energy per pulse is far higher than that at the output of the oscillator 1. However, this level of energy is generally insufficient to exceed the ablation threshold of a solid material 8 such as glass, a semiconductor or a metal, but may suit to a low ablation threshold material such as a polymer.

Nevertheless, it seems that the ablation efficiency does not depend only on the energy per laser pulse. Therefore, the application of ultra-short laser pulses of relatively limited energy and at very high repetition frequency F1 can make it possible to obtain a so-called ablation cooling effect (ablation-cooled material removal) and to significantly increase the efficiency of ablation of the material.

In FIGS. 5 to 8, the same reference signs denote elements that are identical or similar to those of FIGS. 1 to 4.

In the second embodiment, illustrated in FIG. 5, a pulse picker 3 is placed between the pre-amplifier 21 and the power amplifiers 22, . . . , 2N. In the case where the oscillator 1 delivers a sufficient power (for example, higher than 50 mW), the pulse picker 3 can also be placed between the oscillator 1 and the pre-amplifier 21.

The pre-amplifier 21 receives the source pulses 100 at the first repetition frequency F1 and amplifies them to form pre-amplified pulses 210 to the first repetition frequency F1.

The pulse picker 3 includes an optical modulator of the electro-optic or acousto-optic type. The pulse picker 3 receives the pre-amplified pulses 210. The pulse picker 3 selects a burst of M pulses 300, where M is a natural integer number generally comprised between 1 and 1000, or between 50 and 500 pulses, and preferably between 50 and 200 pulses. The pulse picker 3 can operate in pulse-on-demand mode, in burst-on-demand mode or in periodic burst mode at a third repetition frequency, denoted F3, comprised between 100 Hz and 10 MHz, liable to go up to 100 MHz. The time interval between two bursts can vary according to the application. This repetition frequency variation can modify the gain dynamics in the amplifiers and lead to a variation of the energy per pulse. In an example, the pulse picker 3 operates with a reduced duty cycle, lower than 50%, and preferably lower than 30% or even lower than 20%. In a particular embodiment, the pulse picker 3 operates by selecting periodically bursts of M≈80 pulses, at a third repetition frequency F3 equal to ~2 MHz and with a duty cycle of 18%.

In the present document, it is meant by duty cycle of a burst, the ratio between the duration of a burst and the time interval between two successive bursts.

At the output of the pulse picker 3, the pulses 300 hence have an intra-burst repetition frequency equal to the first repetition frequency F1. The pulse picker 3 can select a single burst of pulses or several successive bursts of pulses, with a determined time interval between two successive bursts. In a particular embodiment, the pulse picker 3 selects periodic bursts with a constant time interval between successive bursts. In other words, the pulse picker 3 can operate with an inter-burst repetition frequency equal to the third repetition frequency F3.

According to a particular embodiment, the pulse picker 3 is controlled so as to modulate the amplitude of the pulses in a burst of pulses, according to an envelope defined by the user. For example, the pulse picker 3 applies a top-hat selection to a burst of pulses. Thus, the pulses of the selected burst all have the same amplitude. As an alternative, the pulse picker 3 applies an amplitude modulation having a rising edge, a plateau and a falling edge. In this case, the pulses of the selected burst have an increasing, then constant, then decreasing amplitude. According to another alternative, the pulse pitch 3 applies a saw-toothed amplitude modulation, for example maximum for the first pulse of the burst then decreasing for the following pulses. The person skilled in the art will easily adapt the amplitude modulation profile of the pulse picker 3 as a function of the applications.

The burst of M pulses 300 is injected into the optical power amplifiers 22, . . . , 2N. Thus, the optical amplifier system 2 emits on the output S a burst of laser pulses 500 having an intra-burst repetition frequency equal to the first repetition frequency F1, and an inter-burst repetition frequency equal to the third repetition frequency F3. The optical power amplifiers 22, . . . , 2N deliver the same mean power as a pulse train at the first repetition frequency F1, but over a limited number M of pulses. Consequently, the amplified pulses 500 of a burst have an energy per pulse higher than the energy of the pulses of a pulse train at the first repetition frequency F1, amplified by the same optical amplifier system 2. In the case of a top-hat burst, the energy of a burst is hence equal to the power divided by the third repetition frequency F3 and the energy per pulse in the burst is equal to the energy of this burst divided by the number of pulses M in the burst.

Therefore, each pulse of the burst is amplified to reach an energy comprised between 10 nJ and a few µJ as a function of the application. The second embodiment hence makes it possible to increase the energy per pulse, without reducing the first intra-burst repetition frequency F1.

Moreover, the energy of a burst of pulses is equal to the sum of the energies of each pulse of the burst. Let's consider on the one hand a burst of ~80 fs or ps pulses, the burst of pulses having a duration of the order of the nanosecond, and on the other hand, a laser pulse of nanosecond duration having the same energy than the integrated energy of the considered burst of fs or ps pulses. However, the duration of each pulse of the burst being femtosecond or picosecond, the peak power of the burst of pulses is much higher than the peak power of the nanosecond pulse. The burst mode makes it possible to distribute the energy as a function of time in a very different manner than a nanosecond single-pulse. The laser-material interactions are thus strongly changed.

Therefore, the second embodiment makes it possible to increase the peak power available. The number of pulses in a burst is selected considering the limits of the optical amplifier system.

Now, it seems that the efficiency of ablation of a solid material by a pulse laser depends not only on the energy per pulse, on the pulse duration, but also, in burst mode, on the intra-burst repetition frequency and on the duty cycle of the amplified bursts of pulses. Hence, the application of a burst of ultra-short laser pulses of relatively limited energy and very high intra-burst repetition frequency, F1, can make it possible to obtain the ablation cooling effect (ablation-cooled material removal) and to increase the efficiency of ablation of the material, i.e. to increase the quantity of material removed.

According to a variant, the laser system further includes an optical modulator 9 of the electro-optic or acousto-optic type arranged at the output of the optical amplifier system 2. The optical modulator 9 can be used in a system having no pulse picker 3, illustrated for example in FIG. 4. As an alternative, the optical modulator 9 is used in a system including a pulse picker 3, illustrated for example in FIGS. 5-6. The optical modulator 9 is controlled so as to modulate the amplitude of the amplified pulses, following an envelope defined by the user. For example, the optical modulator 9 applies a top-hat selection to a burst of amplified pulses. Thus, the amplified pulses of the selected burst have all the same amplitude. As an alternative, the pulse picker 3 applies an amplitude modulation having a rising edge, a plateau and a falling edge. In this case, the amplified pulses of the selected burst have an increasing, then constant, then decreasing amplitude. According to another alternative, the optical modulator 9 applies a saw-toothed amplitude modulation, for example maximum for the first pulse of the burst then decreasing for the following pulses. The person skilled in the art will easily adapt the amplitude modulation profile of the optical modulator 9 as a function of the applications.

However, the second embodiment can show drawbacks for the optical power amplifiers 22, . . . , 2N. Indeed, the variation of the period between two bursts is liable to introduce gain instabilities.

In order to stabilize the level of inversion and the gain of the optical power amplifiers, a third embodiment is proposed, which is illustrated in FIG. 6. The third embodiment further includes another source 14, adapted to generate a secondary signal 40, complementary of the burst of M pulses 300.

A coupler 15 operates to combine the burst of M pulses 300 and the secondary signal 40 at the input of the optical power amplifiers.

At the output of the optical amplifier system 2, a coupler-splitter operates to spatially split, on the one hand, the burst of M amplified pulses 500 and, on the other hand, the amplified secondary signal 400.

More precisely, we are in conditions in which the secondary signal 40 is configured in such manner to maintain in the optical power amplifier(s) 22, . . . , 2N the inversion of population exactly at the necessary level to amplify the next burst of M pulses chosen by the user to the desired level of energy. More precisely, the secondary signal 40 is time modulated in such a manner that the energy stored in the optical power amplifier system 22, . . . , 2N remains at the level necessary to amplify the next burst of M pulses 300 to the desired level of energy. Generally, the pulses of the burst of pulses and of the secondary signal 40 have not the same duration and/or the same energy. Nevertheless, the secondary signal 40 is sized so that the combination of the burst of M pulses 300 and of the secondary signal 40 has for effect to maintain the level of inversion of population of the optical amplifier 22, . . . , 2N at the value necessary to extract the desired burst energy with the next burst of M pulses 300. Thus, when the secondary signal 40 is time modulated so that the corresponding time interval is higher than the time interval separating two bursts of M pulses 300, the gain of the optical amplifier system 22, . . . , 2N remains constant for each pulse of the burst of M amplified pulses 500. When a main signal consisted of a burst of M selected pulses 300 is sent to the optical power amplifier 22, . . . , 2N, after a modulation that removes one or several source pulses, all the selected pulses of the burst of M pulses 300 are amplified with a same gain.

In practice, the energy of the pulses of the burst of M amplified pulses 300 is measured as a function of time and the power, energy, wavelength and/or duration of the pulses of the secondary signal 40 injected are changed so as to stabilize the energy of the pulses of the burst of M amplified pulses 300.

Hence, the optical power amplifiers 22, . . . , 2N amplify simultaneously the burst of pulses 30 selected by the pulse picker 3 and the secondary signal 40.

Advantageously, the burst of pulses 30 and the secondary signal 40 have mutually transverse polarization states. In this case, the coupler 19 and the coupler-splitter 16 can be consisted of polarizing optical components.

In a variant, the burst of pulses 30 and the secondary signal 40 have different wavelengths, located in the bandwidth of the optical amplifier system 2. In this variant, the coupler 15 and the coupler-splitter 16 can be consisted of dichroic optical components.

The third embodiment hence makes it possible to stabilize the optical power amplifiers in burst mode. Optionally, the laser system further includes an optical modulator 9 placed at the output of the coupler-splitter 16 so as to modulate the amplitude of the burst of M amplified pulses 500.

In another embodiment, the use of a high repetition frequency oscillator, an optical amplifier system and a repetition frequency multiplier is combined.

Document Can Kerse et al. ("3.5 GHz intra-burst repetition rate ultrafast Yb-doped fiber laser", Optics Communication 366, 2016, 404-409) discloses a fibre amplifier system generating bursts of laser pulses at an intra-burst repetition frequency of 3.5 GHz and a burst repetition frequency of 1 kHz. The following analysis belongs to the present disclosure. This system of the MOPA (Master Oscillator Power Amplifier) type includes a laser oscillator emitting source laser pulses at a source repetition frequency of 108 MHz, a passive optical fibre repetition frequency multiplier device 4 and a system of active optical fibre amplifiers. More precisely, the repetition frequency multiplier device 4 includes six 50/50 couplers arranged in series, five optical delay lines, each optical delay line being arranged between two consecutive 50/50 couplers. This repetition frequency multiplier device 4 operates to multiply the source repetition frequency by a factor equal to $2^5$, hence increasing the source repetition frequency from 108 MHz at 3.5 GHz. This system moreover uses a pre-amplifier, an acousto-optic modulator and 9 stages of optical fibre amplifiers. The acousto-optic modulator applies an envelope determining the shape of the burst of pulses at a repetition frequency of 1 kHz. The bursts of pulses are then amplified in the 9 stages of optical fibre amplifiers. However, this system requires many components in cascade. Moreover, a drawback of this technique is the difficulty to maintain the energy and time spacing stability of the output pulses, in particular due to asymmetries between the branches of the 50/50 couplers. On the other hand, it seems difficult to exploit such a system in a repetition frequency range higher than 3.5 GHz, which would require additional couplers, additional very high accuracy delay lines and additional amplifier stages.

FIGS. 7-8 illustrate a particular aspect that can be combined to one of the above-described embodiments. This particular aspect relates to a factor-2 or 4 repetition frequency multiplier device. This repetition frequency multiplier device is intended to be preferably placed between the oscillator 1 and the optical amplifier system 2. According to a variant, the repetition frequency multiplier device is placed between the optical pre-amplifier and the optical power amplifier system. According to another variant, the repetition frequency multiplier device is arranged at the output of the optical amplifier system 2.

More precisely, FIG. 7 illustrates a factor-2 repetition frequency multiplier or repetition frequency doubler 4. The repetition frequency multiplier device 4 comprises a first optical coupler-splitter 41, a first optical delay line 51 and a second optical coupler-splitter 42. The first optical delay line 51 is arranged between the first optical coupler-splitter 41 and the second optical coupler-splitter 42. The repetition frequency multiplier 4 receives a laser beam 100, 200, 500 comprising laser pulses at the first repetition frequency F1, each laser pulse having an energy per pulse denoted E. The first optical coupler-splitter 41 is adapted to spatially split the laser beam 100, 200 or 500 into a first pulse beam 110 having an energy per pulse equal to E/2 rated at the first repetition frequency F1 and a second pulse beam 120 having an energy per pulse equal to E/2 rated at the first repetition frequency F1. At the output of the first optical coupler-splitter 41, the two split beams have the same properties, the terms "first pulse beam" and "second pulse beam" are here used arbitrarily to be differentiated from each other hereinafter, without entailing any notion of order. The first optical delay line 51 is arranged between the first optical coupler-splitter 41 and the second optical coupler-splitter 42 on a trajectory of the second pulse beam 120. The first optical delay line 51 is suitable to induce an optical delay equal to a half-period of the first repetition frequency F1 on the second pulse beam 120 so as to form a second pulse beam 130 temporarily delayed by a half-period with respect to the first pulse beam 110. The second optical coupler-splitter 42 receives the first pulse beam 110 at the first repetition frequency F1 and the second pulse beam 130, delayed by a half-period at the first repetition frequency F1. The optical delay line 51 is for example consisted by a passive optical fibre of suitable length. The second optical coupler-splitter 42 is for example a 4 input-output optical coupler. The second optical coupler-splitter 42 is adapted to recombine the first beam 110 and the second beam 130 delayed by a half-period and to form on a first output S1 a first recombined beam 142 in which the pulses have an energy per pulse equal to E/4 and are rated at the second repetition frequency F2 equal to twice the first repetition frequency F1. Particularly advantageously, the second optical coupler-splitter 42 can be adapted to recombine the first beam 110 and the second beam 130 delayed by a half-period and to form on a second output S2 a second recombined beam 152 in which the pulses have an energy per pulse equal to E/4 and are rated at the second repetition frequency F2 equal to twice the first repetition frequency F1. Advantageously, the first optical coupler-splitter 41 and the second optical coupler-splitter 42 are 50/50 couplers. In this case, the two outputs S1 and S2 are interchangeable.

Hence, the repetition frequency multiplier device 4 operates to generate a pulse beam 142 having a repetition frequency F2 multiplied by a factor 2 with respect to F1, in which the energy per pulse is only divided by four. Starting from a source oscillator having a first repetition frequency F1 of 800 MHz, a recombined beam 142 and/or 152 is hence obtained, with a repetition frequency of 2×800 MHz=1.6 GHz. This configuration further makes it possible to limit the number of optical amplifiers to obtain an energy per pulse suitable for etching the considered material.

One of the two outputs S1 or S2 is generally used to amplify the pulse beam at the repetition frequency that is twice the repetition frequency of the source oscillator in the optical amplifier system. Indeed, in most of the optical amplifier systems, the amplification must be performed along a single optical axis. In this case, the useful output power of this repetition frequency multiplier device is of about half the input power P, not counting the losses of insertion of the repetition frequency multiplier device.

FIG. 8 illustrates another example of frequency multiplier and, more precisely, a factor-4 repetition frequency multiplier or repetition frequency quadrupler 44. The same reference signs denote the same elements as in FIG. 7. The repetition frequency multiplier 44 further includes an optical combiner 49 and a second optical delay line 52. The second optical delay line 52 is arranged between the second optical coupler-splitter 42 and the optical combiner 49. Advantageously, the second optical coupler-splitter 42 includes four inputs-outputs. The second optical coupler-splitter 42 receives, on one input, the first pulse beam 110 at the first repetition frequency F1 having an energy per pulse E/2 and, on another input, the second pulse beam 130, time delayed by a half-period at the first repetition frequency F1 and having an energy per pulse E/2. As explained in relation with FIG. 7, the second optical coupler-splitter 42 is adapted to recombine the first pulse beam 110 and the delayed second pulse beam 130 and to spatially split them into a first combined beam 142 having an energy per pulse equal to E/4, rated at twice the first repetition frequency (2×F1), and a second recombined beam 152 having an energy per pulse equal to E/4, rated at twice the first repetition frequency (2×F1). The second optical delay line 52 is arranged on the trajectory of the second recombined beam 152. The second optical delay line 52 is adapted to induce an optical delay equal to a quarter of period of the first repetition frequency F1 on the second recombined beam 152 so as to form a second pulse beam 162, time delayed by a quarter of period with respect to the first recombined beam 142. The optical combiner 49 receives the first recombined beam 142 rated at twice the first repetition frequency (2×F1) and the second pulse beam 162, time delayed by a quarter of period of the repetition frequency F1 and rated at twice the first repetition frequency (2×F1). The optical combiner 49 is adapted to recombine the first recombined beam 142 and the second pulse beam 162, time delayed by a quarter of period, and to form on the first output S1 a first quadruple-frequency beam 170 in which the pulses have an energy per pulse equal to E/8 and are rated at a third repetition frequency F3 equal to the quadruple of the first repetition frequency F1. Particularly advantageously, the optical combiner 49 can be adapted to recombine the first split beam 142 and the other split beam 162 and to form on the second output S2 a second quadruple-frequency beam 180, in which the pulses have an energy per pulse equal to E/8 and are rated at the third repetition frequency F3 equal to the quadruple of the first repetition frequency F1. Advantageously, the optical combiner 49 is a 50/50 coupler. In this case, the two outputs S1 and S2 are interchangeable.

Hence, the repetition frequency multiplier 44 makes it possible to generate at least one pulse beam 170, 180 having a third repetition frequency F3 multiplied by a factor 4 with respect to F1, in which the energy per pulse is only divided by eight. Starting from a source oscillator having a first repetition frequency F1 of 800 MHz, a recombined beam having a repetition frequency 4×800 MHz=3.2 GHz is hence obtained.

Therefore, the repetition frequency can be multiplied by a factor 2 or 4. The losses of insertion of the components to be added (delay lines 51, 52 and 50/50 combiners) remain limited by the small number of components. Hence, it is chosen to limit the repetition frequency multiplier to a repetition frequency doubler or quadrupler in order to limit the number of optical coupler-splitter 41, 42, of optical combiner 49 and of optical delay lines 51, 52.

The useful output power of this repetition frequency quadrupler device is of about half the input power P, as in the case of the repetition frequency doubler, not counting the losses of insertion of the repetition frequency multiplier device, i.e. a power comparable to that obtained with a repetition frequency doubler device.

Generally, the oscillator 1 is linearly polarized. Therefore, the source pulses 100, the amplified pulses 200, and, respectively, the pulses of a burst of pulses 500 are linearly polarized.

In one embodiment, the first optical coupler-splitter 41, the second optical coupler-splitter 42 and the optical combiner 49 are isotropic couplers, that affect the polarization state of neither the input nor the output signals. As an alternative, the first optical coupler-splitter 41, the second optical coupler-splitter 42 and the optical combiner 49 are polarizing or polarization-maintaining (PM) couplers. In this case, these couplers are configured and directed so as not to modify the polarization of the polarized input signals and to provide a splitting ratio of 50/50 for the polarization of the input signal. This configuration can be cleverly used in amplifier systems that are isotropic or that have the same amplifier factors along both polarization axes. Indeed, the first quadruple-frequency beam 170 on the first output S1 and the second quadruple-frequency beam 180 on the second output S2 can be used simultaneously. For example, a half-wave plate is used to rotate by 90 degrees the polarization of the first quadruple-frequency beam 170 or of the second quadruple-frequency beam 180, and a polarizer is used to combine the two polarizations. The recombined beam can then be amplified in an isotropic optical amplifier or in a chain of isotropic optical amplifiers. The losses of energy, located at the input of the chain of amplifiers, have only a limited impact on the final energy of the device.

As an alternative, the second recombined beam 180 on the second output S2 can be used to be amplified in another similar optical amplifier system arranged in parallel to have therefore two almost-identical and synchronous GHz sources.

According to another alternative, the first recombined beam 142 and the second pulse beam 162, time delayed by a quarter of period, are amplified before being recombined. The first quadruple-frequency beam 170 on the first output S1 and the second quadruple-frequency beam 180 on the first output S2 can hence be used simultaneously. Advantageously, a pulse compressor is placed only on the first output S1, so as to obtain pulses at the same repetition frequency, but having different pulse durations on the first output S1 and on the second output S2. These pulses of different durations are advantageously spatially recombined, with or without predetermined lateral shift, on a same sample.

In a particular application, the first recombined beam 170 on the first output S1 and the second recombined beam 180 on the second output S2 are used for an in situ diagnostic according to a pump-probe configuration.

In the case where the optimum rate for machining a material is higher than the rate of the source oscillator, the time splitting and combination solution can be applied, with a significantly reduced complexity thanks to an already very high source oscillator rate. For example, starting from an oscillator at 500 MHz (period of 2 ns between each pulse), a rate of about 1 GHz can be performed with a 50/50 pulse splitting, an optical delay line to delay one of the pulses by a half-period and a recombination device. The recombination can be performed either spatially or by polarization. The recombination by polarization is performed essentially without power loss, but the well-defined polarization state will be lost. The spatial recombination can be performed for example via a 50/50 coupler. This recombination is only possible by sacrificing power, because 50% of the incident light goes to the first output S1 and 50% to the second output S2. Nevertheless, this method remains favoured thanks to its flexibility. The 50% loss in the very low power part of the laser system can be accepted without significant impact on the efficiency of the complete laser system.

The optical delay line(s) 51, 52 are all the more difficult to control since the output repetition frequency is high. In practice, the repetition frequency multiplier device makes it possible to reach a repetition frequency going up to 10 GHz or more.

The repetition frequency multiplier device advantageously makes it possible to have two outputs S1, S2, each emitting a laser pulse beam at the same repetition frequency. Such a device allows pump-probe laser applications using the first output to form, for example, a so-called pump laser beam, and the first output to form a so-called probe laser beam.

The source oscillator 1 having a very high rate makes it possible to limit the number of splitting and recombination operations to 2 or 4, while acceding to a repetition frequency in the multi-GHz domain. A laser system is thus obtained, which generates ultra-short pulses at a second repetition frequency F2 in the GHz domain.

As detailed hereinabove, a burst of pulses having an intra-burst repetition frequency in the GHz domain can also be generated, using a pulse picker 3. Periodic bursts of pulses having an intra-burst repetition frequency in the GHz domain and an inter-burst repetition frequency comprised between 100 Hz and 100 MHz can hence be generated. The pulses have a GHz rate and a power comprised between 1 W and 1000 W, and preferably of the order of a few 10 to 100 W.

According to an embodiment, the pulse picker 3 is arranged upstream from the repetition frequency multiplier 4 or 44. In this case, the separation between two pulses incident on the pulse picker 3 is great enough (about 1 to 2 ns) to allow a pulse-to-pulse control with a very good contrast. The pulse picker 3 hence selects a determined number of pulses. The repetition frequency multiplier 4, 44 then generates a burst of pulses comprising a multiple of the number of pulses selected by the pulse picker, the burst having an almost-flat (or top-hat) shape.

In a variant that can be combined with any one of the above-described embodiments, another optical modulator 9 is arranged downstream from the repetition frequency multiplier 4 or 44. The optical modulator 9 is of the acousto-optic or electro-optic type with an analog control of amplitude. The optical modulator 9 operates to modulate the amplitude of the output pulses or to select burst of pulses. The period between two pulses incident on the optical modulator 9 is then reduced by a factor two or four with respect to the period of the source pulses. In this case, the optical modulator 9 is liable to be too slow to select a top-hat burst when the rising time of the optical modulator 9 is higher than the period between two pulses incident on the optical modulator 9.

FIG. 9 illustrates a measurement of a source pulse beam 100 at the output of a mode-locking laser oscillator as shown in FIG. 2 or 3. The mode-locking laser oscillator generates source pulses having a first repetition frequency F1 of ~900 MHz. The period between two successive laser pulses is of the order of 1.1 ns. The duration of the pulses is of the order of 200 fs. The duration of the pulses can be shorter, for example of the order of 100 fs or even lower than 100 fs.

FIGS. 10-11 illustrate an example of generation of bursts of high-energy laser pulses at a very high rate from the source pulses of FIG. 9. A laser system as schematically shown in FIG. 5 is used. FIG. 10 shows a burst of about 80 pulses coming from the oscillator and amplified in an active optical fibre amplifier system. FIG. 11 shows a series of burst of laser pulses with an inter-burst repetition frequency of 2 MHz, a duty cycle of about 18%, the output power of the active optical fibre amplifier system being of the order of 20 W, and the duration of the amplified pulses of ~200 fs.

A pulse laser system according to one of the embodiments described hereinabove finds many applications, in particular in the ablation of solid materials such as glass, a semiconductor such as for example silicon, or metal such as for example copper, aluminium or stainless steel. Polymer or biological materials (cornea, dentin, . . . ) can also be subjected to such a laser treatment.

The invention finds in particular applications for the ablation of various solid materials at a rate of the order of 1 GHz or higher than 1 GHz, or even higher than 10 GHz or 20 GHz, to allow obtaining a so-called ablation cooling.

Advantageously, a non-linear optical frequency doubler or optical frequency tripler optical system is used to convert the wavelength of the pulse beam by doubling or tripling the optical frequency at the output of the very high-rate laser system according to any one of the above-described embodiments.

Such a laser system makes it possible to increase the productivity while maintaining the quality of ablation and the accuracy of the femtosecond (or picosecond) machining. Indeed, this laser system makes it possible to optimize the deposition of energy in a material, by generating a burst having an intra-burst repetition frequency (or second repetition frequency F2) higher than one GHz. Moreover, the laser system makes it possible to control the deposition of energy in the material by successive supply of energy of M pulses at a very high rate in a burst, potentially in a train of pulses at a lower rate. Finally, the laser system makes it possible to control and optimize the deposition of energy as a function of the material with which interaction is desired by adapting the different following parameters: pulse rate in a burst (or time separation between the pulses in a burst), number of pulses in a burst and/or rate of the pulse train.

The laser system of the invention is adapted for industrial applications that are demanding as regards robustness and reliability. Moreover, the laser system is particularly compact, because it is essentially based on small-bulk components (rod, plate or thin disk amplifier crystal) and/or fibre-optic components.

The method for generating laser pulses with a repetition frequency beyond one GHz is in particular adapted for implementing an increase of the efficiency of laser ablation of solid materials.

The invention claimed is:
1. A very high-rate laser system comprising:
a mode-locking oscillator configured to generate a source laser beam comprising a series of source pulses of femtosecond or picosecond duration, at a first repetition frequency higher than or equal to 800 megahertz;
an optical amplifier system configured to receive and amplify the series of source pulses to a second repetition frequency equal to or multiple of the first repetition frequency, the multiple being a natural integer number higher than or equal to two, to generate a series of laser pulses of very high repetition frequency; and
a repetition frequency multiplier device disposed between the oscillator and the optical amplifier system, the repetition frequency multiplier device comprising
a first optical coupler-splitter configured to spatially split the source laser beam into a first pulse beam at the first repetition frequency and a second pulse beam at the first repetition frequency,
a second optical coupler-splitter having a first output,
a first optical delay line disposed between the first optical coupler-splitter and the second optical coupler-splitter on a trajectory of the second pulse beam at the first repetition frequency, the first optical delay line being configured to induce an optical delay equal to a half-period of the first repetition frequency on the second pulse beam and to generate a second pulse beam, delayed by a half-period, and
a second optical coupler-splitter having a first output, the second optical coupler-splitter being configured to recombine the first pulse beam and the second pulse beam, delayed by a half-period, and to form on the first output a first recombined beam in which the pulses are rated at the second repetition frequency equal to twice the first repetition frequency.

2. The laser system according to claim 1, wherein the second optical coupler-splitter has a second output, the second optical coupler-splitter being configured to form, on the second output, a second recombined beam comprising pulses at the second repetition frequency equal to twice the first repetition frequency, the first recombined beam and the second recombined beam being synchronized between each other at the output of the second optical coupler-splitter.

3. The laser system according to claim 1, wherein the repetition frequency multiplier device comprises a second optical delay line and an optical combiner having a first output, the second optical delay line being disposed between the second optical coupler-splitter and the optical combiner on a trajectory of the second pulse beam, the second optical delay line being configured to induce an optical delay equal to a quarter of period of the first repetition frequency on the second recombined beam and to generate a second pulse beam delayed by a quarter of period, the optical combiner being configured to recombine the first recombined beam and the second pulse beam, delayed by a quarter of period, and to form on the first output of the optical combiner a first quadruple-repetition frequency beam comprising pulses at a third repetition frequency equal to the quadruple of the first repetition frequency.

4. The laser system according to claim 3, wherein the optical combiner has a second output, the optical combiner being configured to form, on the second output, a second quadruple-repetition frequency beam comprising pulses at the third repetition frequency equal to the quadruple of the first repetition frequency, the first quadruple-repetition frequency beam and the second quadruple repetition frequency beam being synchronized between each other at the output of the optical combiner.

5. The laser system according to claim 2, wherein the first optical coupler-splitter and the second optical coupler-splitter are polarizing or polarization-maintaining couplers, wherein the laser system further comprises a polarizer device configured to combine the first recombined beam and the second recombined beam.

6. The laser system according to claim 2, further comprising a pulse compressor disposed on the first output of the second optical coupler-splitter and/or another pulse compressor disposed on the second output of the second optical coupler-splitter.

7. The laser system according to claim 4, further comprising a pulse compressor placed on the first output of the optical combiner and/or another pulse compressor disposed on the second output of the optical combiner.

8. The laser system according to claim 1, wherein the mode-locking oscillator is chosen among a group consisting of: a semiconductor oscillator, a solid-state oscillator, a hybrid oscillator, and a fiber-optic oscillator.

9. The laser system according to claim 1, wherein the optical amplifier system includes an optical amplifier or a plurality of optical amplifiers chosen among a group consisting of one or more of an active optical fiber amplifier and a crystal amplifier.

10. The laser system according to claim 1, wherein the optical amplifier system includes a plurality of optical amplifiers arranged in cascade, the plurality of optical amplifiers comprising an optical power amplifier.

11. The laser system according to claim 1, further comprising a non-linear optical frequency doubler or optical frequency tripler optical system.

12. The laser system according to claim 10, further comprising a pulse picker placed downstream from the oscillator and upstream from the optical power amplifier, the pulse picker being configured to select and/or modulate in amplitude a burst of pulses and to inject the burst of pulses into the optical power amplifier.

13. The laser system according to claim 12, further comprising another source configured to generate a pulse beam complementary of the burst of pulses and another coupler configured to receive the secondary beam and the source burst of pulses and combine the secondary beam and the source burst of pulses into a composite pulse beam having a repetition frequency equal to the intra-burst repetition frequency of the burst of pulses, the other coupler being configured to inject the composite pulse beam into the optical power amplifier.

14. The laser system according to claim 1, further comprising an optical modulator disposed downstream from the optical amplifier system, the optical modulator being configured to one or more of: (i) select a burst or a plurality of bursts of amplified pulses and (ii) modulate in amplitude the burst or the plurality of bursts of amplified pulses.

15. A method for generating very high-rate laser pulses, the method comprising:
generating a series of source pulses of femtosecond or picosecond duration by an oscillator having a first repetition frequency higher than or equal to 800 megahertz;
optically amplifying the series of source pulses to a second repetition frequency equal to or multiple of the first repetition frequency, the multiple being a natural integer number higher than or equal to two to generate a series of very high-rate laser pulses;
spatially splitting the source laser beam into a first pulse beam at the first repetition frequency and a second pulse beam at the first repetition frequency;
inducing an optical delay equal to a half-period of the first repetition frequency on the second pulse beam to generate a second pulse beam delayed by a half-period; and
recombining the first beam and the second beam, delayed by a half-period, and formation of a first recombined beam in which the pulses are rated at the second repetition frequency equal to twice the first repetition frequency.

16. The laser system according to claim 4, wherein the first optical coupler-splitter, the second optical coupler-splitter and the optical combiner (49) are polarizing or polarization-maintaining couplers, wherein the laser system further comprises a polarizer device configured to combine the first quadruple-repetition frequency beam and the second quadruple repetition frequency beam.

17. The laser system according to claim 2, wherein the mode-locking oscillator is chosen among a group consisting of: a semiconductor oscillator, a solid-state oscillator, a hybrid oscillator, and a fiber-optic oscillator.

18. The laser system according to claim 3, wherein the mode-locking oscillator is chosen among a group consisting of: a semiconductor oscillator, a solid-state oscillator, a hybrid oscillator, and a fiber-optic oscillator.

\* \* \* \* \*